United States Patent
Sherman et al.

(10) Patent No.: US 8,117,539 B2
(45) Date of Patent: Feb. 14, 2012

(54) METHOD AND SYSTEM FOR BI-DIRECTIONALLY SYNCHRONIZING TRACING RELATIONSHIPS BETWEEN A REQUIREMENTS REPOSITORY AND TEXTUAL REQUIREMENTS DOCUMENTS

(75) Inventors: William Sherman, Hillsborough, NJ (US); Sascha J. Konrad, Plainsboro, NJ (US); Paul J. Bruschi, Princeton Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 913 days.

(21) Appl. No.: 11/960,849

(22) Filed: Dec. 20, 2007

(65) Prior Publication Data

US 2008/0301156 A1 Dec. 4, 2008

Related U.S. Application Data

(60) Provisional application No. 60/941,308, filed on Jun. 1, 2007.

(51) Int. Cl.
*G06F 17/24* (2006.01)
(52) U.S. Cl. ...................................................... 715/255
(58) Field of Classification Search .................. 715/226, 715/255
See application file for complete search history.

(56) References Cited

U.S. PATENT DOCUMENTS

| | | | |
|---|---|---|---|
| 7,899,756 B2* | 3/2011 | Rizzolo et al. | 705/300 |
| 2004/0162833 A1* | 8/2004 | Jones et al. | 707/100 |
| 2006/0117012 A1* | 6/2006 | Rizzolo et al. | 707/9 |
| 2007/0106982 A1* | 5/2007 | Dalal et al. | 717/128 |
| 2007/0130561 A1* | 6/2007 | Siddaramappa et al. | 717/106 |
| 2007/0168916 A1* | 7/2007 | Dahlin et al. | 717/101 |
| 2008/0059977 A1* | 3/2008 | Brown et al. | 719/316 |
| 2008/0275714 A1* | 11/2008 | Martinez | 705/1 |

OTHER PUBLICATIONS

Borland Software Corporation, CaliberRM User Guide, p. 1-310 (2004).*
Jarke, Requirements Tracing, p. 31-36, Communications of the ACM, vol. 41, No. 12 (Dec. 1998).*
Hayes et al., Improving Requirements Tracing Via Information Retrieval, IEEE, Proceedings of the 11th IEEE International Requirements Engineering Conference, 2003, p. 1-10.*
Gotel, O. et al. "An Analysis of the Requirements Traceability Problem," (1994) *First International Conference on Requirements Engineering*, pp. 94-101.
IEEE Xplore Digital Library, "Lessons learned from building a Web-based requirements tracing system", http://ieeexplore.ieee.org/xpl/freeabs_all.jsp?arnumber=667807. This paper identifies the pages where the below-listed document [2] is found in the 1998 Proceedings of the 3rd International Conference on Requirements Engineering: Putting Requirements Engineering to Practice.
Song, Xiping et al., "Lessons Learned From Building A Web-Based Requirements Tracing System", published in: Proceedings of the 3rd International Conference on Requirements Engineering: Putting Requirements Engineering to Practice, 1998, pp. 41-50.

* cited by examiner

*Primary Examiner* — Laurie Ries
*Assistant Examiner* — Frank D Mills (57) ABSTRACT

A method for bi-directional synchronization of tracing relationships between a requirements repository and textual requirements documents, including: in a first operating mode: gathering trace information from a requirements repository; and formatting the trace information and inserting the trace information as text in textual requirements documents; and in a second operating mode: modifying the trace information in the textual requirements documents; and updating the requirements repository to match the modifications that were made in the textual requirements documents.

19 Claims, 9 Drawing Sheets

3.2.3.1.1.2.2 SRS3347 FEAT_304: Simulate CIS representation
This feature allows the user to view a presentation of a Visual Element of a Manual Message at a Workstation. This feature is supplemented by additional details delivered by related features.

| SRS3957 UC_060: Simulate CIS Representation | |
|---|---|
| Purpose | This allows the operator to simulate the Visual Message presentation at a Workstation. |
| Actors | Operator, User Interface |
| Pre-Conditions | The operator has navigated through the user interface to the screen for creating and viewing messages and a Visual Message is in the Content Editor.<br><br>The operator has the appropriate permissions. |
| Success End Conditions | The operator is able to see a simulation of the Visual Message. |
| Failure End Conditions | The operator is unable to see a simulation of the Visual Message as it would be displayed. |
| Included by | Record Visual Message<br>Select a Prerecorded Visual Message from the Message Template Library.<br>Select a Prerecorded Audio + Visual Message from the Message Template Library.<br>Synchronize Audio and Visual Simulation |
| Main Sequence | |

| Step | Actor | Description |
|---|---|---|
| 1 | Operator | Selects the type of ABS Sign to simulate through the user interface. The possible CIS Sign Simulation types are: Single Line Display Simulation, 176 X 32 Two Line Display Simulation, 256 X 32 Two Line Display Simulation, and Four Line Display Simulation. |
| 2 | User Interface | If (Single Line Display Simulation is selected), include Simulate Single Line CIS Sign. |

(PRIOR ART)

FIG. 1

(PRIOR ART)

FIG. 2A

| Requirements: | Traced-from | Traced-to |
|---|---|---|
| SRS3347: FEAT_304: Simulate CIS representation | SRS3345, SSDD1480 | SRS3957, SRS3958, SRS3959 |
| SRS3348: FEAT_617: Simulate CIS – Word processing | SRS3345, SSDD1480 | SRS3962 |
| SRS3349: FEAT_618: Simulate CIS - Images | SRS3345, SSDD1480 | SRS3963 |
| SRS3350: FEAT_619: Simulate CIS - Effects | SRS3345, SSDD770, SSDD14 | SRS3964 |
| SRS3351: FEAT_620: Simulate CIS – Word wrapping | SRS3345, SSDD1480 | SRS3965 |
| SRS3352: FEAT_663: Synchronize A+V preview | SRS3345 | SRS5739 |
| SRS3353: FEAT_25: General Message Creation | SRS3331, SSDD1476, SSDD1 | SRS3354, SRS356 |
| SRS3354: FEAT_26: Spell check | SRS3353, SSDD1476, SSDD1 | SRS3969 |
| SRS3356: FEAT_27: Offensive Word Check | SRS3353, SSDD1477 | SRS3972 |
| SRS3357: FEAT_6: Use a prerecorded message | SRS3331, SSDD1390, SSDD1 | SRS3359, SRS3360, SRS3361 |
| SRS3359: FEAT_401: Convert to Ad-hoc message | SRS3357, SSDD773, SSDD77 | SRS5455 |
| SRS3360: FEAT_13: Select a visual message from the… | SRS3357, SSDD1390, SSDD1 | SRS5456 |
| SRS3361: FEAT_7: Select a prerecorded visual message… | SRS3357, SSDD774, SSDD13 | SRS3973 |
| SRS3362: FEAT_11: Select an audio message from the… | SRS3357, SSDD1390, SSDD1 | SRS5457 |
| SRS3363: FEAT_8: Select a prerecorded audio message… | SRS3357, SSDD1390, SSDD1 | SRS5458 |
| SRS3364: FEAT_12: Select an audio+visual message from… | SRS3357, SSDD1390, SSDD1 | SRS5740 |
| SRS3365: FEAT_9: Select prerecorded audio+visual | SRS3357, SSDD1390, SSDD1 | SRS5459 |
| SRS3366: FEAT_4: Compose visual message | SRS3331, SSDD1367, SSDD1 | SRS3368, SRS3369, SRS3370 |
| SRS3368: FEAT_600: Formatting free text | SRS3366, SSDD1367, SSDD1 | SRS3974 |
| SRS3369: FEAT_601: Formatting elements and variables | SRS3366, SSDD1367, SSDD1 | SRS5425 |
| SRS3370: FEAT_602: Word wrapping | SRS3366, SSDD1367, SSDD1 | SRS3975 |
| SRS3371: FEAT_603: Effects for free text | SRS3366, SSDD770, SSDD13 | SRS3976 |
| SRS3375: FEAT_604: Effects for elements and variables | SRS3366, SSDD331 | |
| SRS3376: FEAT_605: Extra characters | SRS3366, SSDD1367, SSDD1 | SRS3977 |
| SRS3377: FEAT_606: Insert Images | SRS3366, SSDD817 | SRS5705 |
| SRS3378: FEAT_18: Create message from Log | SRS3331, SSDD178, SSDD15 | SRS5426 |
| SRS3379: FEAT_19: Create message for an Incident | SRS3331, SSDD1515, SSDD1 | SRS5744 |
| SRS3380: FEAT_15: Manage Message Attributes and… | SSDD1367, SSDD1368, SSDD | SRS2877, SRS2879, SRS2891 |
| SRS3381: FEAT_305: Launch a message to the message… | SRS3380, SSDD773, SSDD13 | SRS3978 |
| SRS3383: FEAT_429: Display status for device objects | SRS3380, SSDD1494 | SRS5428 |
| SRS5467: FEAT_635: Select priority schema in ad-hoc | SRS3339, SSDD1400, SSDD1 | SRS3956 |
| SRS5468: FEAT_831: Black-out CIS Signs in Test Mode | SSDD1584 | SRS3921 |
| * <Click here to create a requirement> | | |

(PRIOR ART)

Trace information blocks 3.2.3.1.1.2.2 SRS3347 FEAT_304: Simulate CIS representation

Traced From: SSDD1480, FEAT_24
Traced To: UC_060, UC_061, UC_062, UC_063, USC_064

This feature allows the user to view a presentation of a Visual Element of a Manual Message at a Workstation. This feature is supplemented by additional details delivered by related features.

| SRS3957 UC_060: Simulate CIS Representation | |
|---|---|
| Traced From: UIPD57, FEAT_304  Traced To: TCFEAT3429, TCFEAT3430, TCFEAT3431, TCFEAT3432 | |
| Purpose | This allows the operator to simulate the Visual Message presentation at a Workstation. |
| Actors | Operator, User Interface |
| Pre-Conditions | The operator has navigated through the user interface to the screen for creating and viewing messages and a Visual Message is in the Content Editor.  The operator has the appropriate permissions. |
| Success End Conditions | The operator is able to see a simulation of the Visual Message. |
| Failure End Conditions | The operator is unable to see a simulation of the Visual Message as it would be displayed. |
| Included by | Record Visual Message  Select a Prerecorded Visual Message from the Message Template Library.  Select a Prerecorded Audio + Visual Message from the Message Template Library.  Synchronize Audio and Visual Simulation |
| Main Sequence | | |

| Step | Actor | Description |
|---|---|---|
| 1 | Operator | Selects the type of ABS Sign to simulate through the user interface. The possible CIS Sign Simulation types are: Single Line Display Simulation, 176 X 32 Two Line Display Simulation, 256 X 32 Two Line Display Simulation, and Four Line Display Simulation. |
| 2 | User Interface | If (Single Line Display Simulation is selected), include Simulate Single Line CIS Sign. |

METHOD AND SYSTEM FOR BI-DIRECTIONALLY SYNCHRONIZING TRACING RELATIONSHIPS BETWEEN A REQUIREMENTS REPOSITORY AND TEXTUAL REQUIREMENTS DOCUMENTS

CROSS-REFERENCE TO RELATED APPLICATION

This application claims the benefit of U.S. Provisional Application No. 60/941,308, filed Jun. 1, 2007, the disclosure of which is incorporated by reference herein in its entirety.

BACKGROUND OF THE INVENTION

1. Technical Field

The present invention relates to requirements management.

2. Discussion of the Related Art

Requirements management is an essential task of product development, since it assures that a developed product fulfills the expectations of the customer. Requirements traceability, i.e., the ability to "follow the life of a requirement in both a forward and a backwards direction", as stated in O. Gotel, and A. Finkelstein, An Analysis of the Requirements Traceability Problem, 1st International Conference on Requirements Engineering, 1994 pp. 94-101, is an important part of requirements management and provides critical support for developing and maintaining products. Traceability supports analysis in numerous engineering activities such as change analysis, requirements validation, and software code verification.

Requirements traceability is supported by modern requirements managements tools such as (IBM RATIONAL REQUISITEPRO software, 2007, Telelogic DOORS software, 2007, and Borland CALIBER software, 2007. These tools provide the means for developers to specify trace relationships between requirements. Requirements are typically captured in textual form and stored in a requirements repository along with tracing information. These tools provide various views into the repository which allow users to report on and modify the requirements and the traces. These views are only available online to licensed users of the tool; however, it is possible to export the contents of these views into a text document or spreadsheet.

Figure 1:
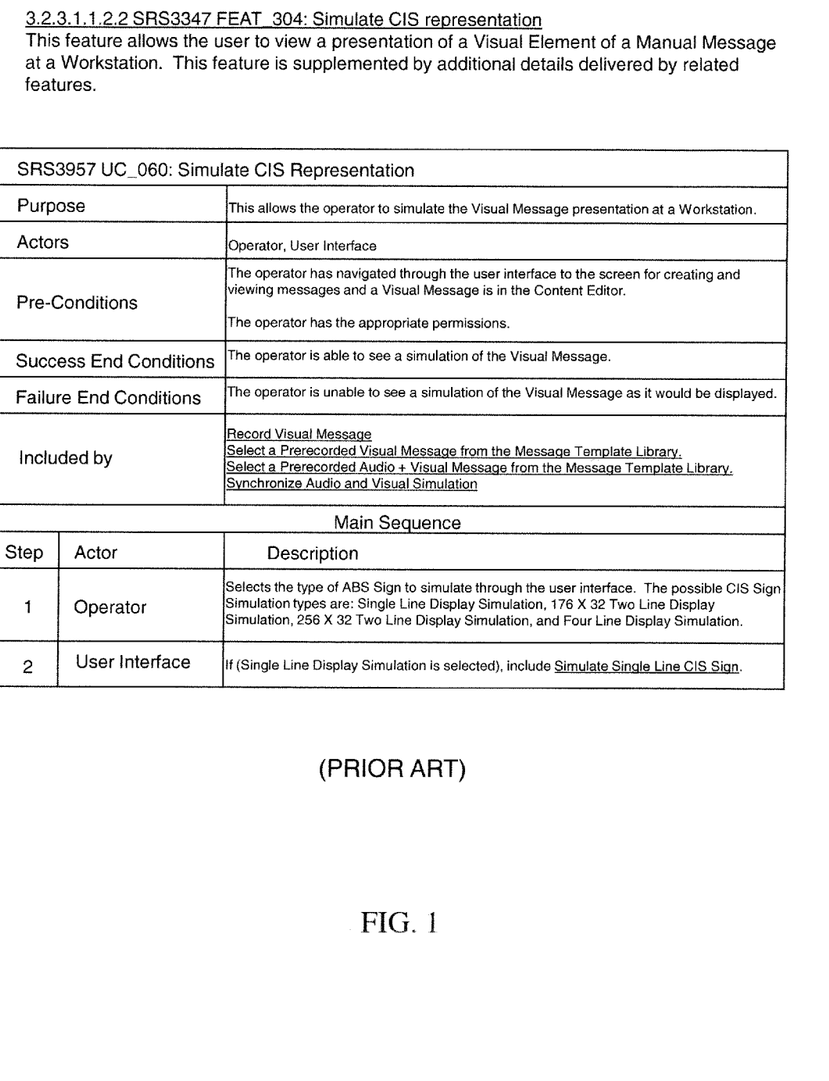
FIG. 1 shows a detailed description of requirements.
Figure 2A:
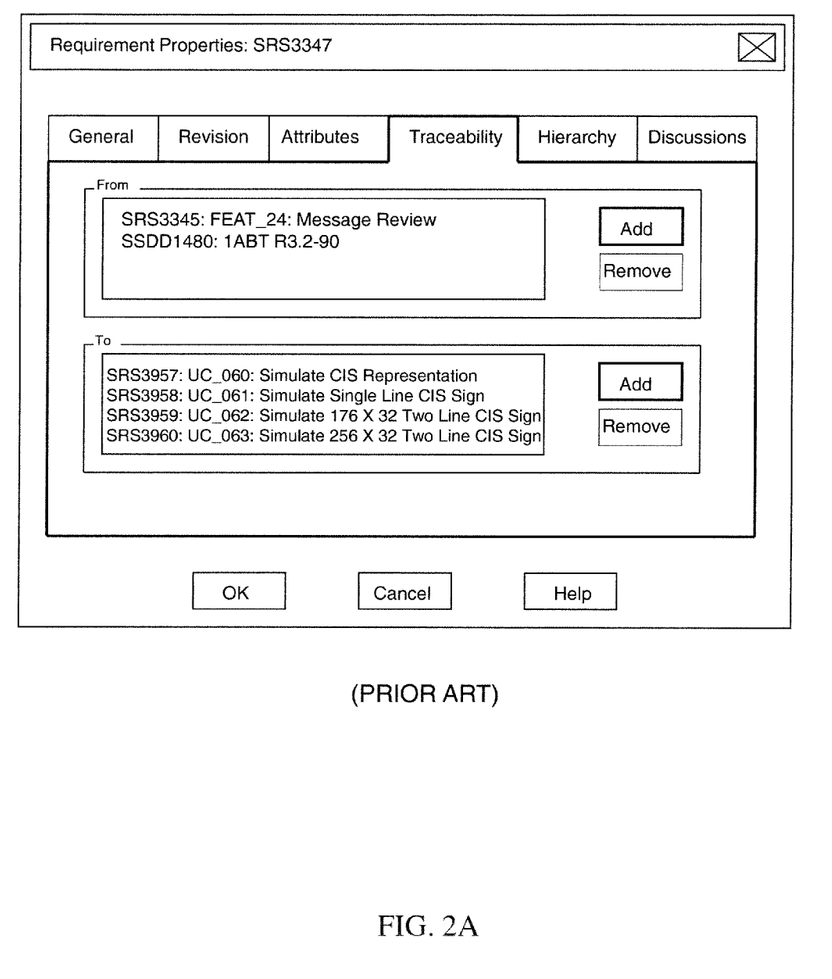

As a result, two different views are used for manipulating requirements and tracing information. One view shows the detailed description of requirements (see e.g., FIG. 1), while another view shows traceability links between identifiers of the requirements (such as names or unique IDs) (see e.g., FIGS. 2A and 2B). While this separation of concerns may be beneficial (for example, one person can do the tracing while another person adds descriptive text to the requirements), in some situations it could be preferable to show and edit requirements details and traceability information in a single view. For instance, if the traceability information could be combined with the detailed requirements information, then a review of the information could be more effective, since both, the requirements and the traces, could be reviewed simultaneously.

SUMMARY OF THE INVENTION

In an exemplary embodiment of the present invention, a method for bi-directional synchronization of tracing relationships between a requirements repository and textual requirements documents, comprises: in a first operating mode: gathering trace information from a requirements repository; and formatting the trace information and inserting the trace information as text in textual requirements documents; and in a second operating mode: modifying the trace information in the textual requirements documents; and updating the requirements repository to match the modifications that were made in the textual requirements documents.

When in the first operating mode the method further comprises: scanning the textual requirements documents for requirements descriptions using a word processor application programmable interface (API), wherein for each requirement found: obtaining a type and a unique identifier of the requirement; deleting all tracing information blocks associated with the requirement; using the unique identifier of the requirement to gather the trace information from the requirements repository via a requirements management tool API; formatting the trace information by constructing a formatted text string containing information identifying where the requirement was traced from and where the requirement is to be traced to; and using the word processor API to insert the trace information into traced from and traced to sections of new tracing information blocks associated with the requirement.

When in the first operating mode the method further comprises inserting a timestamp indicating when the trace information was inserted into the textual requirements documents.

When in the second operating mode the method further comprises: scanning the textual requirements documents for requirements descriptions using a word processor API, wherein for each requirement found: extracting the tracing information associated with the requirement using the word processor API; parsing for a unique identifier of the requirement in traced from and traced to sections of tracing information blocks associated with the requirement; verifying that the unique identifier of the requirement is valid and maintaining a list of errors for reporting; and updating the requirements repository by synchronizing traced from and traced to information associated with the requirement using a requirements management tool API.

The requirements repository is part of a requirements management tool.

The textual requirements documents are documents that are capable of being modified using a word processor API.

In an exemplary embodiment of the present invention, a system for bi-directional synchronization of tracing relationships between a requirements repository and textual requirements documents, comprises: a memory device for storing a program; a processor in communication with the memory device, the processor operative with the program to: in a first operating mode: gather trace information from a requirements repository; and format the trace information and insert the trace information as text in textual requirements documents; and in a second operating mode: modify the trace information in the textual requirements documents; and update the requirements repository to match the modifications that were made in the textual requirements documents.

The processor is further operative with the program when in the first operating mode to: scan the textual requirements documents for requirements descriptions using a word processor API, wherein for each requirement found: obtain a type and a unique identifier of the requirement; delete all tracing information blocks associated with the requirement; use the unique identifier of the requirement to gather the trace information from the requirements repository via a requirements management tool API; format the trace information by constructing a formatted text string containing information identifying where the requirement was traced from and where the requirement is to be traced to; and use the word processor API to insert the trace information into traced from and traced to sections of new tracing information blocks associated with the requirement.

The processor is further operative with the program when in the first operating mode to insert a timestamp indicating when the trace information was inserted into the textual requirements documents.

The processor is further operative with the program when in the second operating mode to: scan the textual requirements documents for requirements descriptions using a word processor API, wherein for each requirement found: extract the tracing information associated with the requirement using the word processor API; parse for a unique identifier of the requirement in traced from and traced to sections of tracing information blocks associated with the requirement; verify that the unique identifier of the requirement is valid and maintaining a list of errors for reporting; and update the requirements repository by synchronizing traced from and traced to information associated with the requirement using a requirements management tool API.

The requirements repository is part of a requirements management tool.

The textual requirements documents ale documents that are capable of being modified using a word processor API.

In an exemplary embodiment of the present invention, a computer readable medium is provided that tangibly embodies a program of instructions executable by a processor to perform method steps for bi-directional synchronization of tracing relationships between a requirements repository and textual requirements documents, the method steps comprising: in a first operating mode: gathering trace information from a requirements repository; and formatting the trace information and inserting the trace information as text in textual requirements documents; and in a second operating mode: modifying the trace information in the textual requirements documents; and updating the requirements repository to match the modifications that were made in the textual requirements documents.

When in the first operating mode the method further comprises: scanning the textual requirements documents for requirements descriptions using a word processor API, wherein for each requirement found: obtaining a type and a unique identifier of the requirement; deleting all tracing information blocks associated with the requirement; using the unique identifier of the requirement to gather the trace information from the requirements repository via a requirements management tool API; formatting the trace information by constructing a formatted text string containing information identifying where the requirement was traced from and where the requirement is to be traced to; and using the word processor API to insert the trace information into traced from and traced to sections of new tracing information blocks associated with the requirement.

When in the first operating mode the method further comprises inserting a timestamp indicating when the trace information was inserted into the textual requirements documents.

When in the second operating mode the method further comprises: scanning the textual requirements documents for requirements descriptions using a word processor API, wherein for each requirement found: extracting the tracing information associated with the requirement using the word processor API; parsing for a unique identifier of the requirement in traced from and traced to sections of tracing information blocks associated with the requirement; verifying that the unique identifier of the requirement is valid and maintaining a list of errors for reporting; and updating the requirements repository by synchronizing traced from and traced to information associated with the requirement using a requirements management tool API.

The requirements repository is part of a requirements management tool.

The textual requirements documents are documents that are capable of being modified using a word processor API.

In an exemplary embodiment of the present invention, a method for bi-directional synchronization of tracing information with requirements, comprises: synchronizing tracing information from a requirements repository with textual requirements descriptions in textual requirements documents by removing old tracing information blocks that include old tracing information associated with the textual requirements descriptions from the textual requirements documents, and replacing the old tracing information blocks with new tracing information blocks that include new tracing information associated with the textual requirements descriptions; and synchronizing modified tracing information from the textual requirements documents with the requirements repository by retrieving the modified trace information from the textual requirements documents and updating the requirements repository to match the modifications that were made in the textual requirements documents.

The tracing information is modified directly in the textual requirements documents.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

BRIEF DESCRIPTION OF THE DRAWINGS

FIGS. 2A and 2B show traceability links between identifiers of requirements;

FIG. 7 is a requirements document created according to an exemplary embodiment of the present invention.

DETAILED DESCRIPTION OF EXEMPLARY EMBODIMENTS

Presented herein is a method and system that provides bi-directional synchronization of traceability information with textual requirements descriptions according to an exemplary embodiment of the present invention. The invention integrates with IBM RATIONAL REQUISITEPRO software, 2007, but can also be extended for use with other requirements management tools.

The invention has two major functions: First, it allows tracing information to be shown from a requirements repository/database directly in textual requirements documents (captured, for example, as Microsoft WORD software documents). Second, in addition to showing this information, tracing information can be edited directly in the Microsoft WORD software documents and the changes are automatically synchronized with the database of the requirements management tool.

Figure 3:
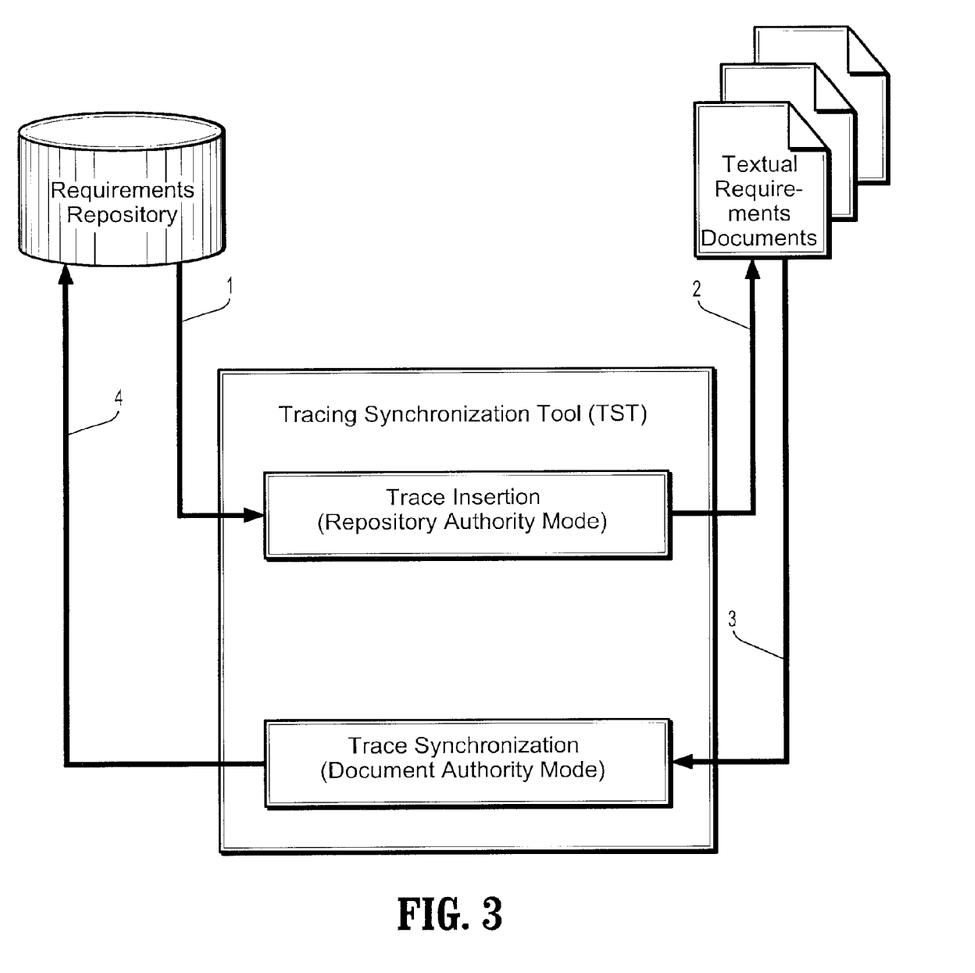
FIG. 3 is a high-level overview of a structure of a method and system for bi-directionally synchronizing tracing relationships between a requirements repository and textual requirements documents according to an exemplary embodiment of the present invention.

FIG. 3 is a high-level overview of a structure of a method and system for bi-directionally maintaining tracing relationships between a requirements repository and textual requirements documents according to an exemplary embodiment of the present invention.

As shown in FIG. 3, a Tracing Synchronization Tool (TST), a requirements repository and textual requirements documents make up the structure.

The TST is a software module that is part of a computer. The TST connects to the requirements repository and to the textual requirements documents via a word processor that is used to maintain the textual requirements documents.

The requirements repository is a database that is part of a requirements management tool such as Rational Requisite Pro. The requirements repository may also be part of a requirements management tool such as Telelogic DOORS software, 2007, Borland CALIBER software, 2007, and StarTrack (X. Song, B. Hasling, G. Mangla, B. Sherman, Lessons Learned from Building a Web-Based Requirements Tracing System, Proceedings of the 3rd International Conference on Requirements Engineering. Putting Requirements Engineering to Practice, 1998).

The textual requirements documents are Microsoft WORD software documents. The textual requirements documents may also be any word processor document type for which the word processor provides an appropriate application programmable interface (API).

As further shown in FIG. 3, reference numerals (1-4) are provided which indicate the steps of a method for bi-directionally maintaining tracing relationships between a requirements repository and textual requirements documents according to an exemplary embodiment of the present invention. This method will now be described with reference to FIG. 4.

Figure 4:
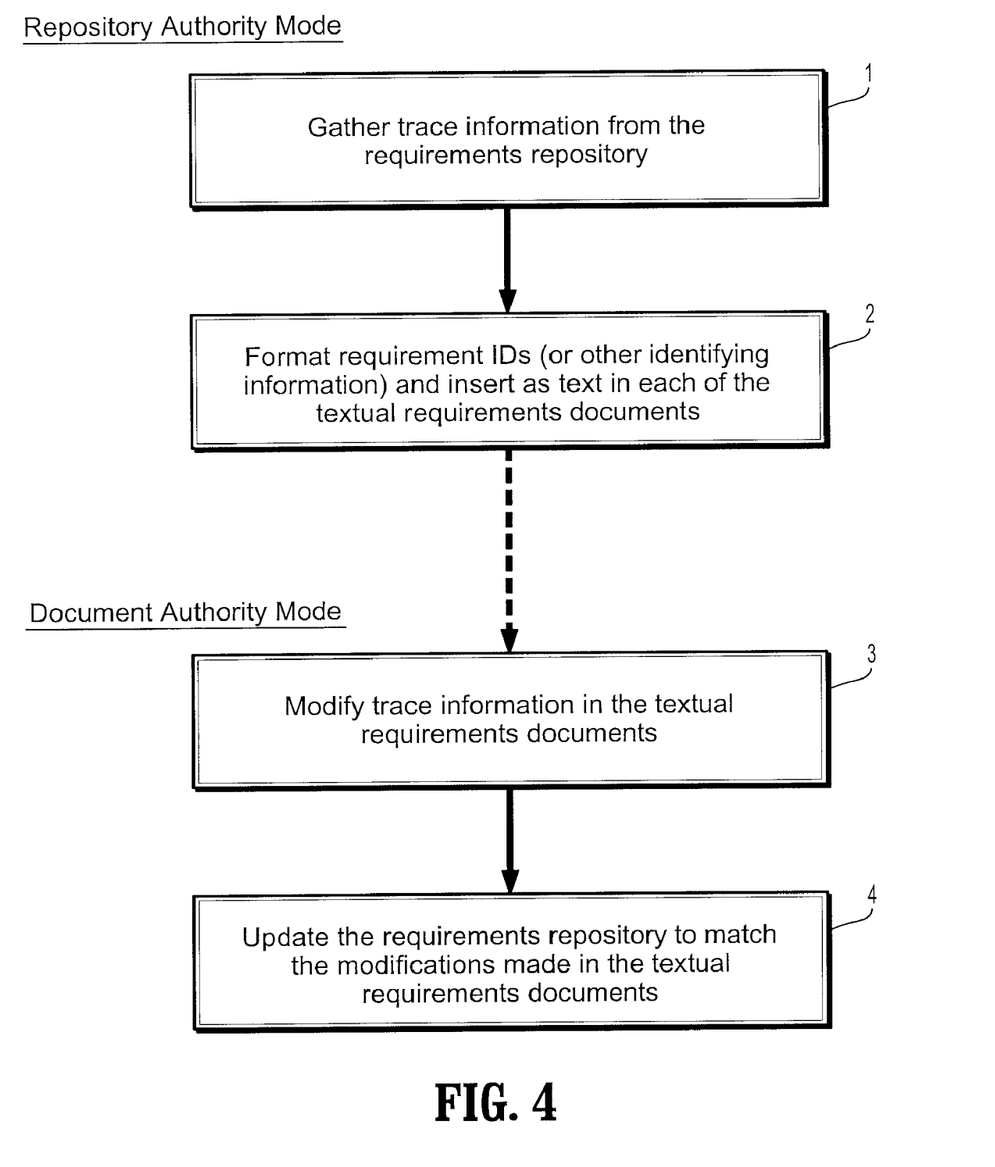
FIG. 4 is a flowchart of a method for bi-directionally synchronizing tracing relationships between a requirements repository and textual requirements documents according to an exemplary embodiment of the present invention.

As shown in FIG. 4, the method employs two modes of operation: repository authority and document authority.

In the repository authority mode, trace information is gathered from the requirements repository (1). Requirement IDs (or other identifying information) are formatted appropriately and inserted as text in proper places in each textual requirements document (2). These appear as trace information blocks below the requirements. Examples of this are shown in FIG. 7. As changes are made to the requirements repository, the textual requirements documents are periodically brought up to date by removing old trace information blocks and replacing them with new trace information blocks. A timestamp indicating when the trace insertion was performed is also placed in the document.

In the document authority mode, textual requirements documents maintainers directly modify the trace information blocks in the textual requirements documents (3). The textual requirements documents are then scanned to retrieve the trace information blocks, i.e., identifiable areas of a textual requirements document that contain tracing information. Trace information blocks can be marked using a label or specific text formatting. These are then used to update the requirements repository to match the modifications that were made in the textual requirements documents (4). Any incorrectly specified trace information that is detected is flagged for correction.

By using the TST in such a manner: 1) Developers can edit tracing information in the requirements repository via a user interface of the requirements management tool. The TST then automatically inserts the tracing information into the textual requirements documents. 2) Developers can modify the tracing information in the textual requirements documents with a word processor. The TST then updates the requirements repository of the requirements management tool to reflect the modifications in the textual requirements documents.

The repository authority mode, which is used to synchronize information from the requirements repository to the textual requirements documents, will now be described with reference to FIG. 5.

Figure 5:
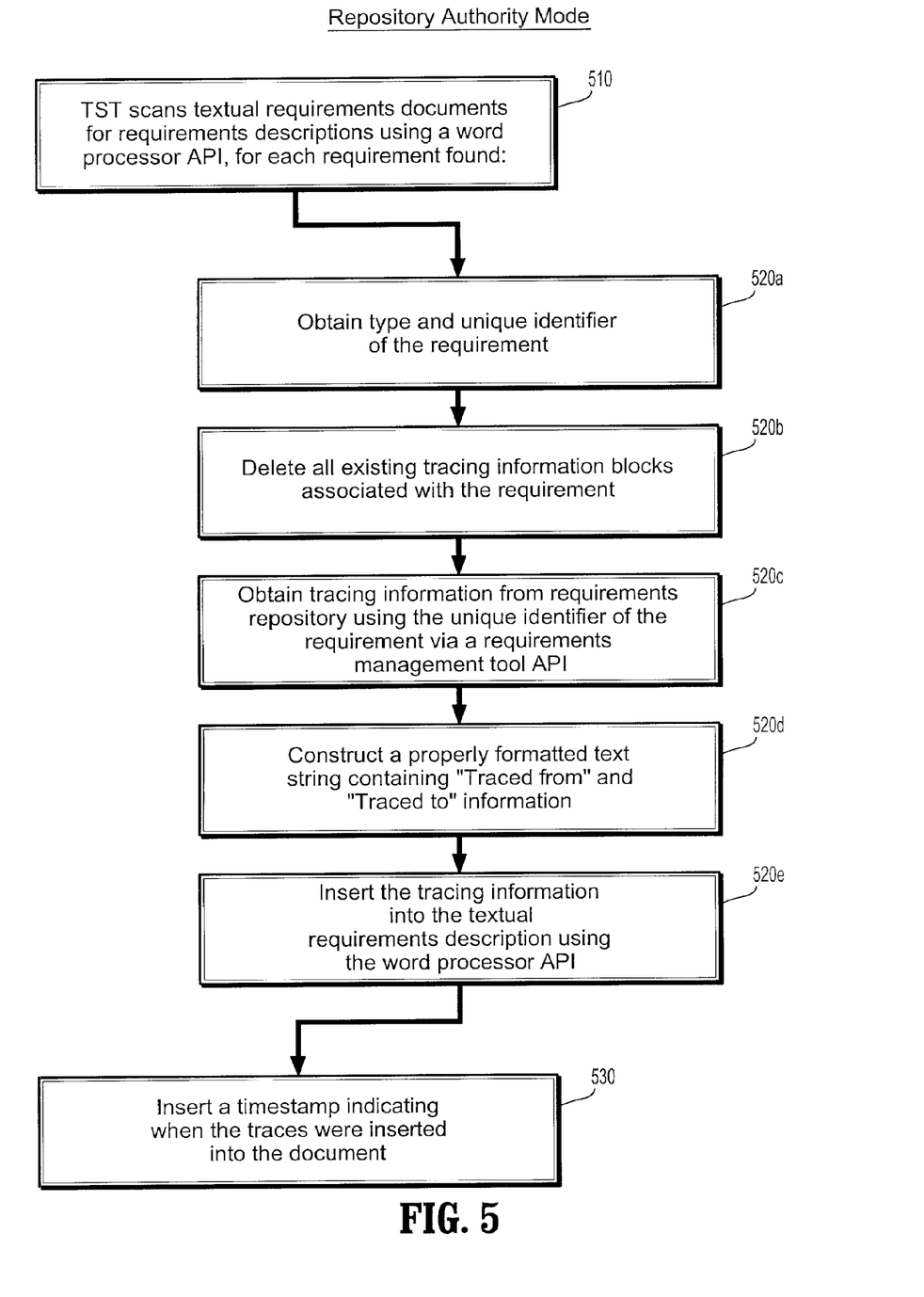
FIG. 5 is a flowchart of a repository authority mode according to an exemplary embodiment of the present invention.

As shown in FIG. 5, the TST scans the textual requirements documents for requirements descriptions using a word processor API (e.g., Microsoft WORD software) (510).

For each requirement found:

Obtain the type and unique identifier of the requirement (520a).

Delete any existing tracing information block (520b).

Obtain tracing information from the requirements repository using the unique identifier of the requirement via a requirements management tool API (e.g., Requisite Pro) (520c).

Construct a properly formatted text string containing "Traced from" and "Traced to" information (520d). The format of the tracing information may depend on the requirement type.

Insert the tracing information into the textual requirements document using the word processor API (520e).

Next, insert a timestamp indicating when the traces were inserted into the textual requirements document (530).

The document authority mode, which is used to synchronize information from the textual requirements documents to the requirements repository, will now be described with reference to FIG. 6.

Figure 6:
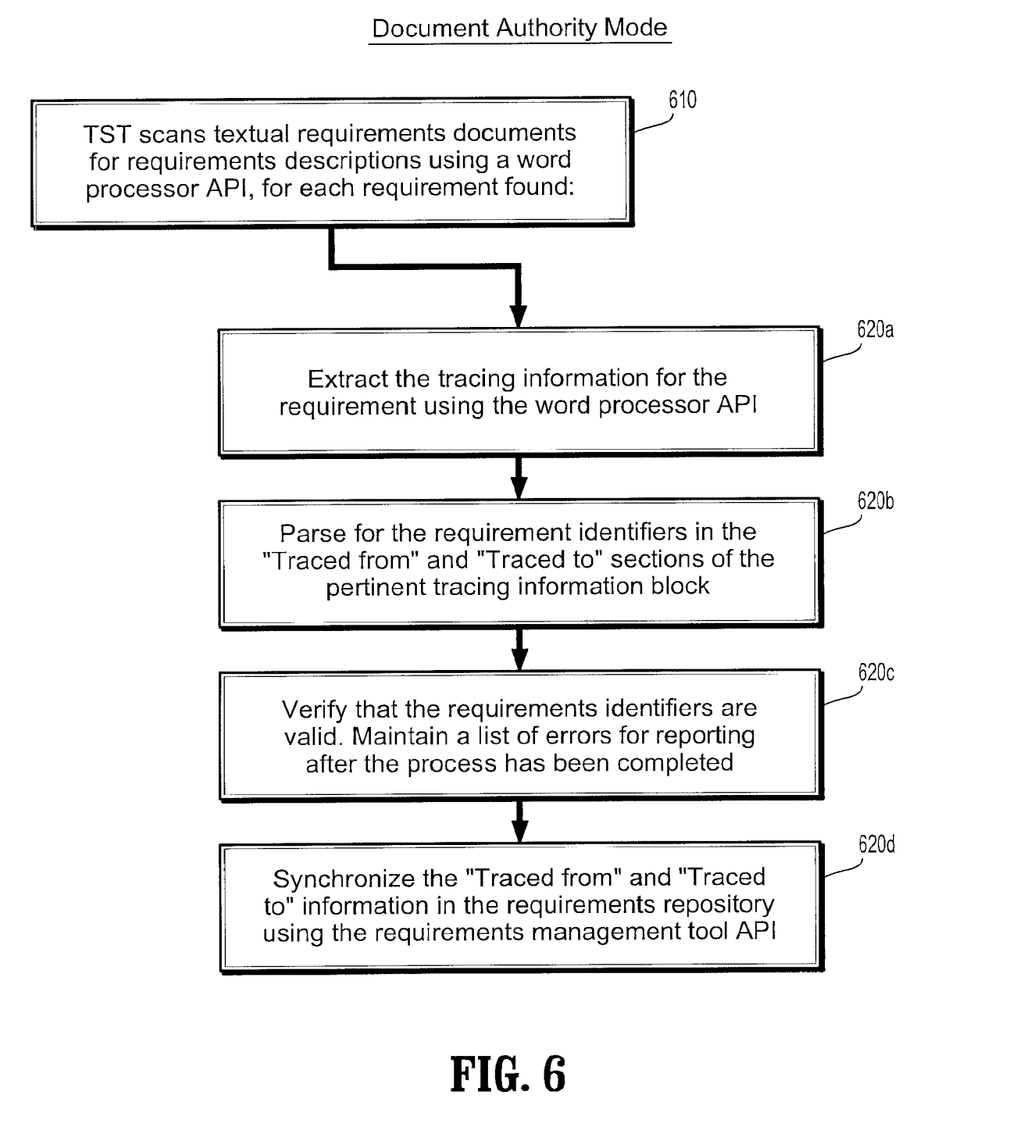
FIG. 6 is a flowchart of a document authority mode according to an exemplary embodiment of the present invention.

As shown in FIG. 6, the TST scans the textual requirements documents for requirements descriptions using a word processor API (e.g., Microsoft WORD software) (610).

For each requirement found:

Extract the tracing information for the requirement using the word processor API (620a).

Parse for the requirement identifiers in the "Traced from" and "Traced to" sections of the tracing information block (620b).

Verify that the requirements identifiers are valid. Maintain a list of errors for reporting after the process has been completed (620c).

Synchronize the "Traced from" and "Traced to" information in the requirements repository using the requirements management tool API (620d).

FIG. 7 is a requirements document created using the TST. As can be gleaned, the requirements document displays a detailed description of the requirement SRS3347 (SRS3347 being the requirement ID, the requirement type being embedded in the requirement ID) and traceability information (the "Traced from" and "Traced to" information shown in the trace information blocks) in a single view. By doing so, the requirements and their traceability information as shown, for example, in FIG. 1 and FIGS. 2A and 2B, respectively, can be readily accessible in one view. This eliminates the need to switch between requirements documents and the requirements management tool, thereby enabling tracing information to be more efficiently managed. In addition, a stakeholder does not have to access the requirements management tool to review or modify the tracing information.

Some aspects of the above-described invention will now be discussed.

The invention enables developers and reviewers to see a more complete picture of the requirements by combining detailed textual requirements information with traceability information.

The invention enables developers to more efficiently manage traceability by editing the tracing information in the view of the detailed textual requirements (i.e., in the textual requirements documents).

The invention enables more efficient and thorough reviews by making the traceability information readily accessible outside the tool environment.

The invention removes the need for developers or stakeholders to use the user interface of the requirements management tool. Tracing information may be modified in the textual description, which is first verified against the requirements repository and then synchronized.

The invention reduces cost by eliminating the need for all reviewers to have a license for accessing the requirements management tool.

The invention reduces cost by eliminating the need for all reviewers to be trained in the use of the requirements management tool.

The invention can increase the productivity of the requirements management process. For example, the invention lows developers to view and modify the tracing information in the same view as the detailed requirements. As such, the overhead of using two separate views for managing requirements is reduced. If desired, the developer can use just the word processor to capture requirements and tracing information, and does not have to use the user interface of the requirements management tool.

The invention enables requirements reviews that are performed by stakeholders to be greatly facilitated. For example, previously, stakeholders needed access to the requirements management tool to access tracing information. As such, there was significant cost for acquiring licenses and training to use the requirements management tool. Using the invention, the tracing information can be embedded into the requirements documents. Thus, since most stakeholders already have and are familiar with their word processor, there are no additional licensing or training costs involved.

The invention also enables the ability to work on the textual requirements document entirely "offline", since there is no need for any connection either wired or wireless to edit the document.

A system in which exemplary embodiments of the present invention may be implemented will now be described with reference to FIG. 8.

Figure 8:
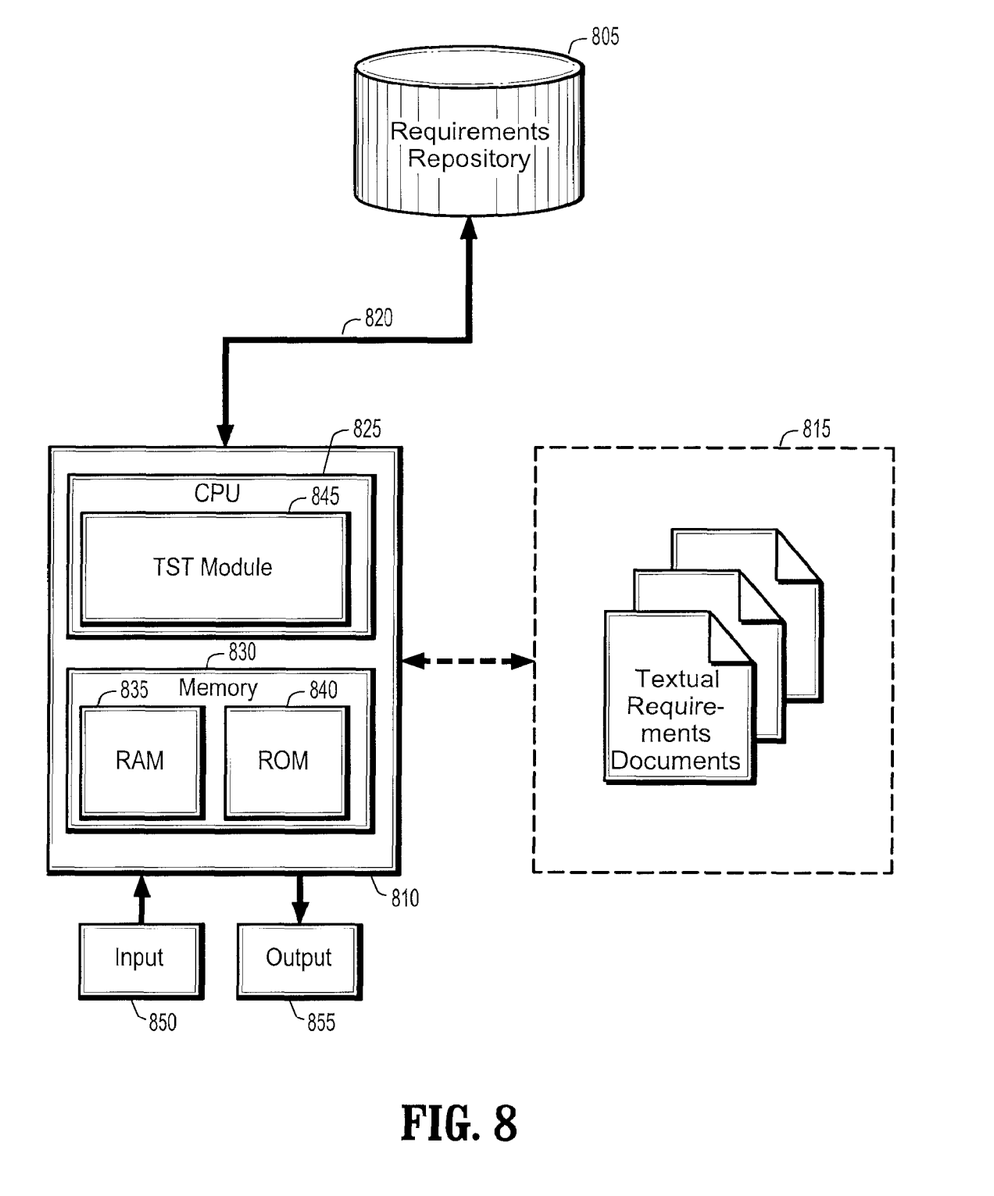
FIG. 8 is a block diagram of a system in which exemplary embodiments of the present invention may be implemented.

As shown in FIG. 8, the system includes a requirements repository 805, a computer 810 and word processor API 815 connected over a wired or wireless network 820 such as the internet.

The requirements repository 805 is the same as the requirements repository shown in FIG. 3.

The computer 810, which may be a portable or laptop computers includes a central processing unit (CPU) 825 and a memory 830 which are connected to an input device 850 and an output device 855. The CPU 825 includes a TST module 845 that includes software for executing the above-described functions of the TST shown in FIG. 3.

The memory 830 includes a random access memrory (RAM) 835 and a read-only memory (ROM) 840. The memory 830 can also include a database, disk drive, tape drive, etc., or a combination thereof. The RAM 835 functions as a data memory that stores data used during execution of a program in the CPU 825 and is used as a work area. The ROM 840 functions as a program memory for storing a program executed in the CPU 825. The input 850 is constituted by a keyboard, mouse, etc., and the output 855 is constituted by a liquid crystal display (LCD), cathode ray tube (CRT) display, printer, etc.

The word processor API 815 is part of any word processor that is used to maintain textual requirements documents. The textual requirements documents may be stored in the computer 810. The word processor is resident in the computer 810 and is operable via the word processor API 815.

It is understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is also understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is further understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, hut the invention is to be defined in accordance with the claims that follow. It can be appreciated that many of those undescribed embodiments are within the literal scope of the following claims, and that others are equivalent.

What is claimed is:

1. A method, comprising:
   in a first operating mode:
   gathering trace information from a requirements repository; and
   formatting the trace information and inserting the trace information as text in textual requirements documents; and
   in a second operating mode:
   modifying the trace information in the textual requirements documents; and updating the requirements repository to match the modifications that were made in the textual requirements documents, wherein the trace information and a requirement in a textual requirements document are managed in a single view in each of the first and second operating modes and, in the second operating mode, the trace information appears in a block below the requirement in the textual requirements document, the trace information is modified within the block, and then, the block is marked so that an automated tool that scans the textual requirements document identifies the block as containing modified data and automatically updates the requirements repository with the modifications that were made to the trace information based on this identification.

2. The method of claim 1, wherein when in the first operating mode the method further comprises:

scanning the textual requirements documents for requirements descriptions using a word processor application programmable interface (API), wherein for each requirement found:

obtaining a type and a unique identifier of the requirement;

deleting all tracing information blocks associated with the requirement;

using the unique identifier of the requirement to gather the trace information from the requirements repository via a requirements management tool API;

formatting the trace information by constructing a formatted text string containing information identifying where the requirement was traced from and where the requirement is to be traced to; and using the word processor API to insert the trace information into traced from and traced to sections of new tracing information blocks associated with the requirement.

3. The method of claim 2, wherein when in the first operating mode the method further comprises:

inserting a timestamp indicating when the trace information was inserted into the textual requirements documents.

4. The method of claim 1, wherein when in the second operating mode the method further comprises:

scanning the textual requirements documents for requirements descriptions using a word processor API, wherein for each requirement found:

extracting the tracing information associated with the requirement using the word processor API;

parsing for a unique identifier of the requirement in traced from and traced to sections of tracing information blocks associated with the requirement;

verifying that the unique identifier of the requirement is valid and maintaining a list of errors for reporting; and updating the requirements repository by synchronizing traced from and traced to information associated with the requirement using a requirements management tool API.

5. The method of claim 1, wherein the requirements repository is part of a requirements management tool.

6. The method of claim 1, wherein the textual requirements documents are documents that are capable of being modified using a word processor API.

7. A system, comprising:

a memory device for storing a program;

a processor in communication with the memory device, the processor operative with the program to:

in a first operating mode:

gather trace information from a requirements repository; and format the trace information and insert the trace information as text in textual requirements documents; and in a second operating mode:

modify the trace information in the textual requirements documents; and update the requirements repository to match the modifications that were made in the textual requirements documents, wherein the trace information and a requirement in a textual requirements document are managed in a single view in each of the first and second operating modes and, in the second operating mode, the trace information appears in a block below the requirement in the textual requirements document, the trace information is modified within the block, and then, the block is marked so that an automated tool that scans the textual requirements document identifies the block as containing modified data and automatically updates the requirements repository with the modifications that were made to the trace information based on this identification.

8. The system of claim 7, wherein the processor is further operative with the program when in the first operating mode to:

scan the textual requirements documents for requirements descriptions using a word processor application programmable interface (API), wherein for each requirement found:

obtain a type and a unique identifier of the requirement;

delete all tracing information blocks associated with the requirement;

use the unique identifier of the requirement to gather the trace information from the requirements repository via a requirements management tool API;

format the trace information by constructing a formatted text string containing information identifying where the requirement was traced from and where the requirement is to be traced to; and use the word processor API to insert the trace information into traced from and traced to sections of new tracing information blocks associated with the requirement.

9. The system of claim 8, wherein the processor is further operative with the program when in the first operating mode to:

insert a timestamp indicating when the trace information was inserted into the textual requirements documents.

10. The system of claim 7, wherein the processor is further operative with the program when in the second operating mode to:

scan the textual requirements documents for requirements descriptions using a word processor API, wherein for each requirement found:

extract the tracing information associated with the requirement using the word processor API;

parse for a unique identifier of the requirement in traced from and traced to sections of tracing information blocks associated with the requirement;

verify that the unique identifier of the requirement is valid and maintaining a list of errors for reporting; and update the requirements repository by synchronizing traced from and traced to information associated with the requirement using a requirements management tool API.

11. The system of claim 7, wherein the requirements repository is part of a requirements management tool.

12. The system of claim 7, wherein the textual requirements documents are documents that are capable of being modified using a word processor API.

13. A computer readable medium tangibly embodying a program of instructions executable by a processor to perform method steps, the method steps comprising:

in a first operating mode:
gathering trace information from a requirements repository; and
formatting the trace information and inserting the trace information as text in textual requirements documents; and in a second operating mode:
modifying the trace information in the textual requirements documents; and
updating the requirements repository to match the modifications that were made in the textual requirements documents, wherein the trace information and a requirement in a textual requirements document are managed in a single view in each of the first and second operating modes and, in the second operating mode, the trace information appears in a block below the requirement in the textual requirements document, the trace information is modified within the block, and then, the block is marked so that an automated tool that scans the textual requirements document identifies the block as containing modified data and automatically updates the requirements repository with the modifications that were made to the trace information based on this identification.

14. The computer readable medium of claim 13, wherein when in the first operating mode the method further comprises:

scanning the textual requirements documents for requirements descriptions using a word processor application programmable interface (API), wherein for each requirement found:
obtaining a type and a unique identifier of the requirement;
deleting all tracing information blocks associated with the requirement;
using the unique identifier of the requirement to gather the trace information from the requirements repository via a requirements management tool API;
formatting the trace information by constructing a formatted text string containing information identifying where the requirement was traced from and where the requirement is to be traced to; and
using the word processor API to insert the trace information into traced from and traced to sections of new tracing information blocks associated with the requirement.

15. The computer readable medium of claim 14, wherein when in the first operating mode the method further comprises:

inserting a timestamp indicating when the trace information was inserted into the textual requirements documents.

16. The computer readable medium of claim 13, wherein when in the second operating mode the method further comprises:

scanning the textual requirements documents for requirements descriptions using a word processor API, wherein for each requirement found:
extracting the tracing information associated with the requirement using the word processor API;
parsing for a unique identifier of the requirement in traced from and traced to sections of tracing information blocks associated with the requirement;
verifying that the unique identifier of the requirement is valid and maintaining a list of errors for reporting; and
updating the requirements repository by synchronizing traced from and traced to information associated with the requirement using a requirements management tool API.

17. The computer readable medium of claim 13, wherein the requirements repository is part of a requirements management tool.

18. The computer readable medium of claim 13, wherein the textual requirements documents are documents that are capable of being modified using a word processor API.

19. A method, comprising:

removing old tracing information from a tracing information block in a textual requirements document, wherein the old tracing information is associated with textual requirements descriptions in the textual requirements document, and inserting new tracing information associated with the textual requirements descriptions into the tracing information block; and
retrieving the new tracing information from the textual requirements document and updating a version of the textual requirements document stored in a requirements repository so that the version of the textual requirements document stored in the requirements repository includes the new tracing information,
wherein the new tracing information is inserted into the tracing information block while the textual requirements associated with the new tracing information are simultaneously displayed and the tracing information block is disposed below a requirement in the textual requirements document.

* * * * *